United States Patent [19]
Nordin

[11] Patent Number: 5,001,634
[45] Date of Patent: Mar. 19, 1991

[54] METHOD FOR MAPPING OF SEA LEVEL UNDULATIONS WITH APPLICATIONS TO HYDROCARBON PROSPECTING

[75] Inventor: Per-Gunnar Nordin, Lund, Sweden

[73] Assignee: Petroscan AB, Göteborg, Sweden

[21] Appl. No.: 136,710

[22] Filed: Dec. 22, 1987

Related U.S. Application Data

[63] Continuation-in-part of Ser. No. 946,428, Dec. 23, 1986, abandoned.

[51] Int. Cl.$^5$ .................... G06F 15/20; G01V 7/06; G01V 9/00
[52] U.S. Cl. .................................. 364/420; 73/382 G
[58] Field of Search ......... 364/420; 73/170 R, 170 A, 73/382, 382 G; 342/25, 120, 123, 190, 191; 324/323, 330

[56] References Cited

U.S. PATENT DOCUMENTS

| | | | |
|---|---|---|---|
| 3,038,338 | 6/1962 | Boitnott | 73/382 |
| 3,242,736 | 3/1966 | Winter et al. | 73/384 |
| 3,888,122 | 6/1975 | Black | 73/382 |
| 4,244,223 | 1/1981 | Geiger | 73/382 G |
| 4,321,601 | 3/1982 | Richman | 342/25 |

FOREIGN PATENT DOCUMENTS

| | | | |
|---|---|---|---|
| 8100307 | 2/1981 | World Int. Prop. O. | |
| 8601592 | 3/1986 | World Int. Prop. O. | |

OTHER PUBLICATIONS

Rapp, Gravity Anomalies and Sea Surface Heights Derived From a Combined GEOS 3/Seasat Altimeter Data Set, vol. 91 No. B5, *Journal of Geophysical Research*, 4867–4876 (Apr. 10, 1986).

Brennecke, Lelgemen, Geoid and Gravity Anomalies in the North Sea Area Derived from SEASAT-Altimeter Data, 7 Marine Geophysical Research, 113–115 (1984).

Liang, The Adjustment and Combination of GEOS-3 and SEASAT Altimeter Data, Ohio State University, Jun. 1983.

Rapp, The Determination of Geoid Undulations and Gravity Anomalies from SEASAT Altimeter Data, vol. 88, No. C3, *Journal of Geophysical Research*, 3281–3296 (Feb. 28, 1983).

Lerch, Marsh, Klosko, Williamsom, Gravity Model Improvements for SEASAT, vol. 87, No. C5, *Journal of Geophysical Research*, 3281–3296 (Apr. 30, 1982).

(List continued on next page.)

*Primary Examiner*—Jerry Smith
*Assistant Examiner*—David Huntley
*Attorney, Agent, or Firm*—Merchant, Gould, Smith, Edell, Welter & Schmidt

[57] ABSTRACT

A method of making for an area a map or a representation of regional variations in the position of the geoid which have an amplitude less than about 1 m. and are caused by density variations in the underlying sea floor. The map or representation is intended primarily for use in the determination of part areas of the sea floor with increased probability of deposits of natural resources, the density of which part areas distinguishes from that of the surroundings. The method comprises (a) obtaining height values which indicate the sea surface height in relation to reference level and which have been calculated by means of altimeter data measured from a flying craft and by means of information about the orbits of the flying craft during measurement of the altimeter data;

(b) sorting out incorrect and improbable values; and (c) adapting the height values corresponding to different orbits of the flying craft to one another, such that maximum agreement of height values is obtained in the crossing points of the orbits, whereby relative values of the geoid position are established. The method is characterised by (d) filtering off long-wave variations with a wave length exceeding about 200 km in the geoid position;

(e) amplifying variations in the geoid position which have a selected spread; and (f) correcting the geoid position in respect of interference from the water depth.

3 Claims, 5 Drawing Sheets

OTHER PUBLICATIONS

Brammer, Sailor, Preliminary Estimates of the Resolution Capability of the SEASAT Radar Altimeter, vol. 7, No. 3, *Geophysical Research Letter*, 193-196 (Mar. 1980).

Apel, Wilson, A Review of Major Scientific Results from U.S. Satellite Altimetry and Projections for the Future, 7 Marine Geophysical Researches, 1-16 (1984).

Fifield, The Shape of the Earth from Space, *New Scientist* (Nov. 15, 1984).

New Analytical Technique, Ocean Industry, May 1985.

Dorman, The Use of Nonlinear Functional Expansions in Calculation of the Terrain Effect in Airborne and Marine Gravimetry and Gradiometry, vol. 39, Nos. 1-6, *Geophysics* 33-38 (1974).

Vonbun, Marsh, Skylab Earth Resources Experiment Package (EREP): Sea Surface Topography Experiment, vol. 13, No. 4, *Journal of Spacecraft and Rockets*, 248-250 (Apr. 1976).

Moore, Imaging Radars for Geoscience Use, IEEE Transactions on Geoscience Electronics 155-164 (Jul. 1971).

Nash and Jordan, Statistical Geodesy-An Engineering Perspective, vol. 66, No. 5, Proceedings of the IEEE, 531-550 (May 1978).

Proceedings of the IEEE, vol. 66, No. 5, issued May 1978 (Raymond A. Nash, Jr. et al.), "Statistical Geodesy-An Engineering Perspective", see p. 541f, paragraph IVD, in particular p. 543, subparagraph 3.

Ikeda, *Patent Abstracts of Japan,* vol. 10, No. 110, (P450), Abstract No. 59-95523.

Henry L. Alder, Edward B. Roessler, Introduction to Probability and Statistics, (W. H. Freeman and Co.), pp. 283-307 and pp. 195-205.

Wayne A. Fuller, Introduction to Statistical Time Series, (Wayne A. Fuller), pp. 387-419.

Hewlett-Packard Davis Handbook, pp. 54-55 and Appendix A.

METHOD FOR MAPPING OF SEA LEVEL UNDULATIONS WITH APPLICATIONS TO HYDROCARBON PROSPECTING

This is a continuation-in-part application of application Ser. No. 946,428 filed Dec. 23, 1986 and now abandoned.

BACKGROUND OF THE INVENTION

The present invention is concerned with prospecting and relates more particularly to a method of making for an area a map or a representation of regional variations in the position of the geoid which have an amplitude less than about 1 m. and are caused by density variations in the underlying sea floor, said map or representation being intended primarily for use in the determination of areas of the sea floor with increased probability of deposits of natural resources, the density of which part areas distinguishes from that of the surroundings, downward bends in the geoid towards the sea floor indicating part areas having a density lower than that of the surroundings, and upward bends in the geoid from the sea floor indicating part areas having a density higher than that of the surroundings.

Hydrocarbon deposits sufficiently rich to justify exploitation occur in rock traps on land and below the sea floor. The oil and/or gas in these traps has a slightly lower density than the surrounding bedrock. This is one of the facts utilised in oil prospecting operations.

For present day offshore oil prospecting, use is made of a number of different techniques of which the following are the most important ones:

(a) Seismic survey which involves the generating of acoustic impulses by means of an air gun and measuring of the signals reflected from certain geological markers below the sea floor by means of various types of sensors. The signals received fluctuate in time in response to density variations in the different layers and formations below the sea floor and the depth to these layers and formations. The signals thus provide a geological picture indicating structures and main faults which could contain oil/gas accumulations.

(b) Magnetometric survey which involves measuring the intensity and the direction of the terrestrial magnetic field.

(c) Gravimetric survey which involves measuring minor variations in the vertical component of the gravitational field at the sea surface by means of an instrument which, in principle, comprises a spring-suspended sinker. The deflection of the instrument reflects the total force of gravity from all mass lying vertically between the location where the survey is carried out and the center of the earth. In other words, large mass densifications can contribute considerably to the deflection of the instrument even if they are at very large depths, where no exploitation of the natural resources can be made. The measuring accuracy of present day instruments is about 5-10 mGal.

(d) Geological survey and bottom samples by which it is intended, inter alia, to judge whether the conditions within the prospecting area during earlier geological times have been favourable to the formation of hydrocarbon-bearing areas, and it is investigated whether the rock is of the type in which oil/gas usually is to be found.

(e) Electrical survey which involves investigating the character of the sea floor by resistivity measurements.

(f) Geochemical survey. Hydrocarbon traps generally leak a certain amount of oil or gas to the overlying sediments, and in some instances it is possible to trace and analyse these leaks by means of bottom samples.

All of these prior art techniques suffer from the disadvantage that they are not very accurate in forecasting oil deposits. Exploratory drillings in the areas which these techniques have indicated as promising, have revealed commercial quantitites of oil/gas in less than 20% of the trial holes, calculated on a world-wide basis. Since oil prospecting by the above-mentioned techniques and, especially subsequent exploratory drillings are extremely expensive, large sums of money could be saved if the forecasting accuracy could be increased, and if the areas in which exploratory drillings must be made could be restricted.

In other types of prospecting, such as in ore and mineral prospecting, data are utilised which are collected by means of satellites for mapping areas with likely deposits. The techniques used for this purpose are colour television technique, picture analysis/processing and multispectral recording.

Furthermore, it is known that satellites are able to provide altimeter data, i.e. information about the distance between the satellite and the sea surface. A satellite revolves around the earth in a great circle plane. Since the earth rotates on its north-south axis, the satellite will gradually move back and forth within an area between specific north and south latitudes, the width of said area being determined by the orbital angle of the satellite. This area will eventually have been scanned by the satellite which then has passed over the area along north-western and south-western tracks, crossing each other and forming a deformed grid pattern.

Altimeter data are measured at regular intervals along these tracks. At the crossing points of the tracks, the altimeter data will have been recorded at different times for one and the same point. Because the tidal lift is different at different times, because the wind force is different, because the satellite is at different altitudes depending upon whether it has travelled over land or sea before it reaches the measuring point, etc., the altimeter data measured at different times will differ considerably at the crossing points. The differences may amount to ±5 meters.

By means of these altimeter data and information about the orbit of the satellite, it is then possible to calculate height values indicating the position of the sea surface in relation to a reference ellipsoid which is an imaginary ellipsoid representing the shape of the earth as accurately as possible. These height values are used to study the undulation of the sea surface which is not entirely globular in shape, but slightly undulatory. In places where the force of gravity is stronger, the sea bulges slightly outwardly (water masses are attracted to these places), and in place where the force of gravity is somewhat less, the sea bulges slightly inwardly. The sea surface has, in other words, adapted itself to the interior mass conditions of the earth. Further, if all interference from waves, tides, currents etc. is eliminated, the sea surface forms a surface with constant gravity potential, a so-called geoid.

Up to now, the altimeter data have been utilised mainly for determining the position of the geoid, expressed in absolute numbers as a height above the reference ellipsoid. However, because of the difficulties involved in accurately determining the orbit of the satellite and in finding exact corrections for tides, waves, currents etc., only the variations in the geoid position which have a large spread and high amplitude could be determined. Scientific literature in this field gives examples of observations of variations in the geoid position of the order −40 m. to +60 m. Variations of this order are entirely without interest for prospecting purposes and, besides, have not been utilised therefor.

Moreover, altimeter data have been utilised for mapping the topography of the sea floor. Thus, seamounts attract water from the surroundings and raise the sea level.

Two papers by Richard H. Rapp, "The Determination of Geoid Undulations and Gravity Anomalies from Seasat Altimeter Data", Journal of Geophysical Research, Vol. 88, No. C3, pp. 1552-1562, Feb. 28, 1983, and "Gravity Anomalies and Sea Surface Heights Derived from a Combined GEOS 31 Seasat Altimeter Data Set", Journal of Geophysical Research, Vol. 91, No. B5, pp. 4867-4876, Apr. 10, 1986, disclose a method of globally mapping the sea surface height expressed in absolute numbers above a reference ellipsoid. The method comprises obtaining height values which indicate the sea surface height in relation to a reference level and which have been calculated by means of altimeter data measured from a flying craft and by means of information about the orbits of the flying craft during measurement of the altimeter data; sorting out incorrect and improbable values; and adapting the height values corresponding to different orbits of the flying craft to one another, such that maximum agreement of height values is obtained in the crossing points of the orbits. The values established for the variations in the sea surface height are, in addition, converted into variations in the gravity acceleration expressed in mGal. However, such conversion causes errors in the values because it presupposes that all mass is concentrated in a point, which is not the case.

It is the object of the present invention to determine regional variations, i.e. geographically limited and high-frequency variations, in the geoid position, said variations having an amplitude which is less than about 1 m. and is caused by density variations in the underlying sea floor, and to make a map or representation of these variations, which can be used in prospecting for natural resources in the sea floor.

SUMMARY OF THE INVENTION

This object is achieved by means of a method as described above which is characterised by filtering off long-wave variations with a wave length exceeding about 200 km in the geoid position; amplifying variations in the geoid position which have a selected spread; and correcting the geoid position in respect of interference from the water depth.

In this manner, regional undulations in the geoid can be found which are caused by the difference in the density in the underlying part of formations under the sea floor and the density in the surrounding parts of formations under the sea floor. In areas which lie underneath regional downward bends in the geoid and which thus have a lower density than the surroundings, the chances of finding oil/gas are, as will appear from the above, greater than in other locations. In areas which lie underneath regional upward bends in the geoid and thus have a higher density than the surroundings, the chances of finding oil/gas are, however, very small.

The reverse applies to deposits of ore and minerals which have a higher density than the bedrock in which they occur.

To be able to determine these regional variations in the position of the geoid, which are caused by density variations in formations under the sea floor, the height values are corrected such that any interference from larger-scale phenomena, such as tides, mass variations in the magma and other deep lying formations, etc. are eliminated. Furthermore, in order to achieve adequate accuracy, one merely considers relative values of the geoid position and disregards any absolute values of the geoid position.

One advantage of this prospecting technique is that it is more reliable than conventional prospecting methods in forecasting natural resources. In areas where the method according to the present invention was used to determine that the geoid has a local downward bend of more than 25 cm, oil and/or gas have so far been found in about 70% of the exploratory wells being drilled in such areas. Generally, it may be said that downward bends of more than about 10 cm are of interest to prospecting for commercially profitable deposits. A further advantage of the invention is that one can predict with a high degree of accuracy in which areas there is no oil or gas to be found. In areas where the sea surface has an upward bend of 5 cm or more, almost none of hundreds of wildcats have encountered hydrocarbons (maximum oil/gas shows). The possibility of sorting out uninteresting areas is, of course, an important cost-saving factor in that exploratory drillings can be confined already at the outset to profitable areas.

Another advantage of this prospecting technique is that, in contrast to conventional gravimetrical technique, it reflects the density variations solely in the outer part of the earth's crust where hydrocarbon deposits can be profitably exploited. Deeper lying systems affect the geoid position over a large area, and the effect of these systems is eliminated by the method according to the invention, wherein long-wave variations are filtered off. In this connection, long-wave variations are supposed to mean variations with a wave length exceeding about 200 km.

The invention can be used universally for prospecting operations at sea. However, since it is extremely expensive to drill in areas with great depths of water, the method according to the invention is used primarily on the continental shelves.

BRIEF DESCRIPTION OF THE DRAWINGS

An embodiment of the present invention will be described below, reference being had to the accompanying drawings in which.

DESCRIPTION OF THE PREFERRED EMBODIMENT

Figure 1:
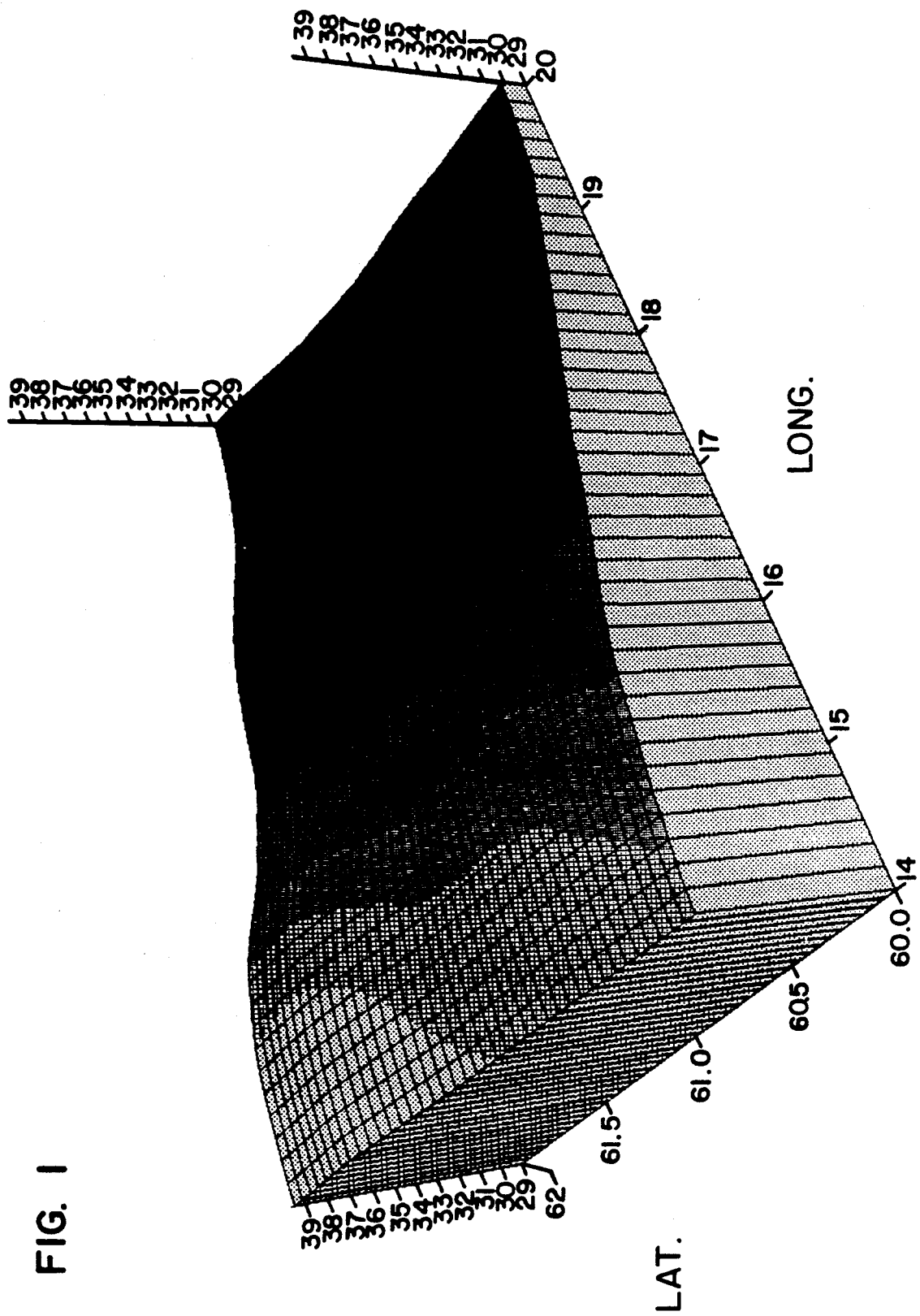
FIG. 1 is a simulated three-dimensional graphic representation of a first matrix containing interpolated altitude values.

A satellite travelling in an orbit of high accuracy samples, for example ten times every second, the distance to the sea surface by means of a radar altimeter. These altimeter data are transmitted to different ground stations in which data associated with too noisy and weak signals are sorted out. The remaining data and information about the satellite orbit are then used for calculating height values indicating the position for the sea surface in relation to a reference ellipsoid. These height values are then compiled in data bases from which they can be obtained for calculation purposes. Since collection of the altimeter data and calculation of the height values do not form part of the present invention, they will not be further described.

The height values calculated on the basis of said altimeter data, are used, in accordance with the present invention, for determining regional variations in the geoid position. These regional variations are determined by correcting the height values in different ways for large-scale phenomenon effects. The corrections preferably are made by means of a computer, and the final result can be presented in the form of a map of the area investigated showing the regional variations in the geoid position, or in the form of profiles indicating the density variations in the sea floor, or in the form of some other representation, for example in the form of signals recorded on a magnetic tape and containing corresponding information.

The following is a description of how the method according to the invention is carried out by means of a computer. In the event that use is made of programs not commercially available, the expert in the field will have no difficulty in designing corresponding programs based on the information provided by the specification.

In a first step, the height values obtained from a data base are stored in a first file. The height values in this file are then checked in different ways in order to find and eliminate erroneous and improbable values.

The values are first checked for any undesired "double tracks", i.e. a doubled set of data from one and the same satellite track. Such double tracks may occur because several ground stations are receiving the same data. If a double track is detected, the data set associated with one of these tracks is removed.

After that, measuring values subjected to interference from land are sorted out. Since the radar waves are scattered while travelling between the satellite and the sea surface, each altimeter data actually is a mean value for one measurement area. If there is land within this measurement area, the altimeter measured value will be incorrect. All height values based on altimeter data whose measurement areas contain land must therefore be sorted out, and this is done by means of maps and on the basis of the information available about the size of each measurement area associated with a specific altimeter measured value.

After that, the height values are checked with respect to wave height, wind and standard deviation. In areas where the waves have been very high and/or the wind has been very strong when the altimeter data were recorded, corresponding height values are removed. Waves that are too high and winds that are too strong are reflected in that the standard deviation of the altitude values will be large.

Furthermore, the height values are checked with respect to Δ-altitude, i.e. the difference between two successive values, and ripple, i.e. the acuteness of the bend in the water surface. The reason for this correction is that there are physical limits to how much a water surface can incline. Optionally, and simultaneously with this correction, also a tidal correction is effected by means of known values of the tidal lift.

Finally, a check is made of individual points and interruptions in tracks. In those cases where a satellite approaches land and passes over many islands, it may occur that only one measuring point at a great distance from the remaining measuring points from the track remains after removal of height values based on altimeter data subject to interference from land. Such a measuring point is then of slight value and is sorted out. It is also checked that the tracks contain no longer interruptions. In such a case, the tracks are sorted out.

After these corrections have been effected, the remaining height values are stored in a second base file. If desired, the computer can be used for plotting the height values associated with the different satellite tracks, which preferably is done by utilising different colours in order to mark different heights above the reference ellipsoid. Such a graphic representation also provides an opportunity for subjective assessment of the height values. The plotting shows that height values based on altimeter data measured in the same point but at different times differ considerably because of several factors, as has been explained above. However, none of these factors is associated with the required density variations in the sea floor. The tracks may therefore be raised, lowered and angled such that maximum agreement is established at the crossing points, while maintaining the information about the density variations in the sea floor intact. For this reason, the above-mentioned elimination of incorrect and improbable values is followed by a step in which the tracks are adapted to one another such that maximum agreement between height values for different tracks is obtained at the crossing points.

This adaptation step is initiated by dividing the tracks into south-western and north-western tracks, whereupon the latitude and longitude of the crossing points as well as the time between the start of the track and each crossing point are calculated, the time calculation being based upon exact information about the time interval between each measuring point.

After the positions of the crossing points have been determined, a main track and a control track are selected. The main track is selected among the south-west tracks and preferably should extend as far as possible through the search area, i.e. essentially diagonally. The control track is selected among the north-west tracks and should also extend as far as possible through the search area. If there is no sufficiently long control track, two control tracks may be selected. During the subsequent adaptation of the track positions to one another, the main track is maintained fixed, and neither its height nor its angular position is changed. The angular position of the control track also remains unchanged during the subsequent adaptation, but its height may be changed such that the control track will intersect the main track.

The main track and the control track define a plane to which the remaining tracks are adapted in the best possible way in that they are raised or lowered as well as angled. This adaptation is based upon the least square method and can be carried out by means of a commercially available calculation program from the NAG library. The input data to this calculation program are a matrix containing the latitude and longitude of the crossing points, the height difference for each crossing point and the time from the start of the track to the crossing point, as well as information about which track is the main track and which is the control track. From this calculation program, a result file is obtainable which indicates the height difference between the tracks at the crossing points and the mean height difference for all crossing points. By studying these data, individual points or whole tracks may be found which obviously are incorrect and should be eliminated. The adaptation is repeated until a satisfactory result has been obtained.

The output data from the calculation program are in the form of a correction file containing the magnitude of the angling and of the raising or lowering that must be carried out for each track. The height values in base file 2 are corrected by means of the corrections in the correction file, and the corrected height values are stored in base file 3.

Then, all superfluous data are sorted out, and merely latitude, longitude and the corrected height value for each crossing point are retained and stored in a fourth base file. Upon adaptation of the satellite tracks to the main track and the control track, the height values have been made independent of the original reference ellipsoid. The height values thus are no longer absolute values in relation to the reference ellipsoid, but merely are relative values.

The crossing points do not cover the search area completely. In some parts of the area, the crossing points lie close together, whereas in other parts they are fairly sparsely arranged. To make the global or large-scale trend within the area quite clear, an interpolation is made by means of an interpolation method known as GINTP1, whereby a first matrix is obtained.

If desired, the first matrix may then be plotted by means of a printer or on the screen of the computer. FIG. 1 illustrates a simulated three-dimensional graphic representation of the first matrix, in which the x axis indicates longitude values, the y axis latitude values, and the z axis height values in meter above a reference level, i.e. the variation in height for the geoid position. The Figure clearly shows that the global trend resides in an inclination downwards in a direction toward greater longitude values.

After that, the fourth base file is corrected for the global trend by filtering off interference from long-wave phenomena, such as tides. Filtration may be accomplished by, for example, calculation of a regression plane which is subtracted from the height values. Filtration may also be compared to a straightening-out of the entire search area, such that the altitude values will lie within the smallest possible interval, without on that account changing their interrelationship. The operation may be compared to having a crumpled and sloping or warped paper, the folds of which correspond to the regional variations in the geoid position, and the slope or warp of the paper corresponding to the global trend within the search area. If the paper is straightened up, i.e. if the global trend is removed, no information about the regional variations has been lost, but these regional variations will be more readily comparable. In FIG. 1, the correction for the global trend implies that the plane is inclined such that the left-hand short end is lowered and the right-hand short end is raised.

After the global trend has thus been eliminated, a further interpolation is carried out in the manner described above, and a second matrix is obtained.

Figure 2:
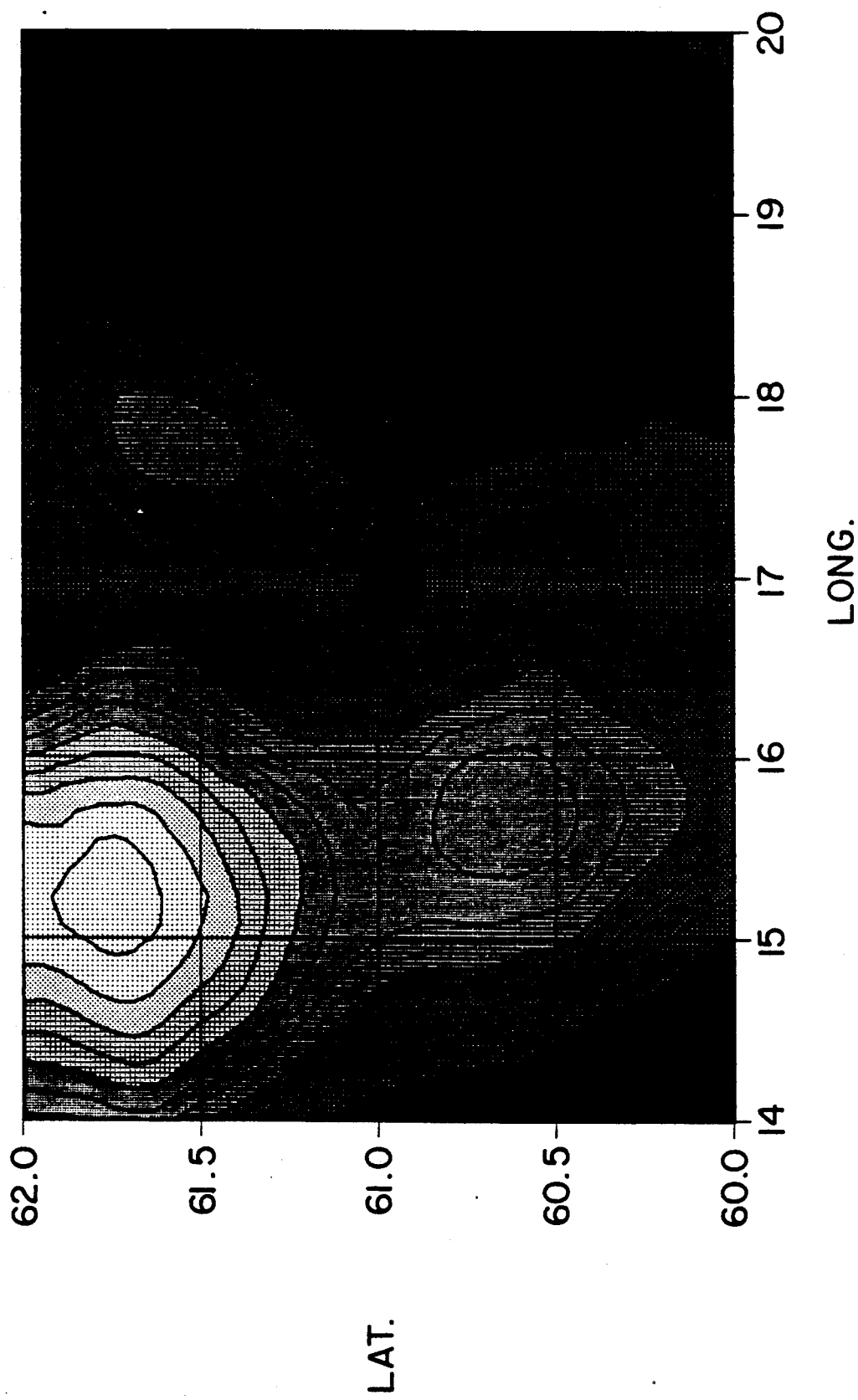
FIG. 2 is a graphic representation of a second matrix which is obtained after correction for the global trend.

The second matrix is illustrated graphically in FIG. 2 in which the x axis indicates longitude values, the y axis indicates latitude values, and height values within different intervals are illustrated by different rasterings. In the Figure altitude curves having a distance of 0.15 m have been drawn to make the height position of the geoid within the area appear more clearly. These curves and the rasterings show that the geoid has a downward bend in an area between long 19°-20° and lat 61.0°-61.5°.

In subsequent steps, phenomena of the order which is of interest for oil/gas prospecting are studied and amplified. Amplification is achieved in the following manner. First, a square size is selected which depends upon the size of the phenomena to be studied. The square size may extend from about 10 km × 10 km and upwards, and the squares need not be equilateral, but may just as well be rectangular. After the square size has been selected, a mean value of all height values within each square is formed, whereupon the mean value matrix is interpolated up to the same matrix size as the second matrix and is subtracted therefrom. The result is a third matrix showing variations in the geoid position of the size which is of interest to oil/gas prospecting.

Figure 3:
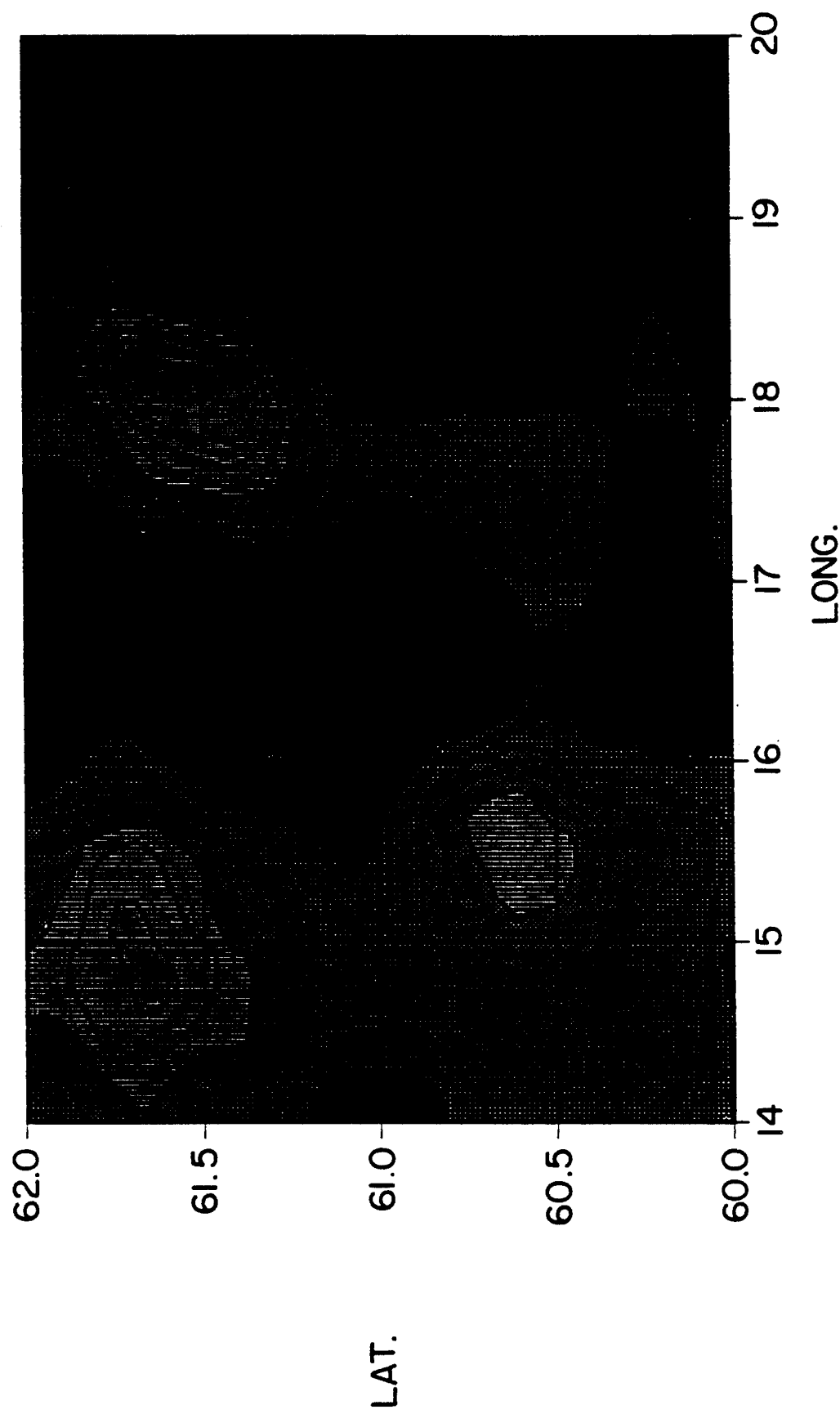
FIG. 3 is a graphic representation of a third matrix which is obtained after mean value formation within squares has been carried out.

The third matrix is illustrated graphically in FIG. 3 in which, as in FIG. 2, the x axis indicates longitude values, the y axis indicates latitude values, and altitude values within different intervals are shown by different rasterings. The distance between the altitude curves in this Figure is 0.05 m. If FIG. 3 is compared to FIG. 2, it will be found that regional bends not seen in FIG. 2 will appear in FIG. 3. In FIG. 3, for example, a regional downward bend is shown at long 17°, lat 60.0°-60.5°, a bend which is not to be seen in FIG. 2.

Figure 4:
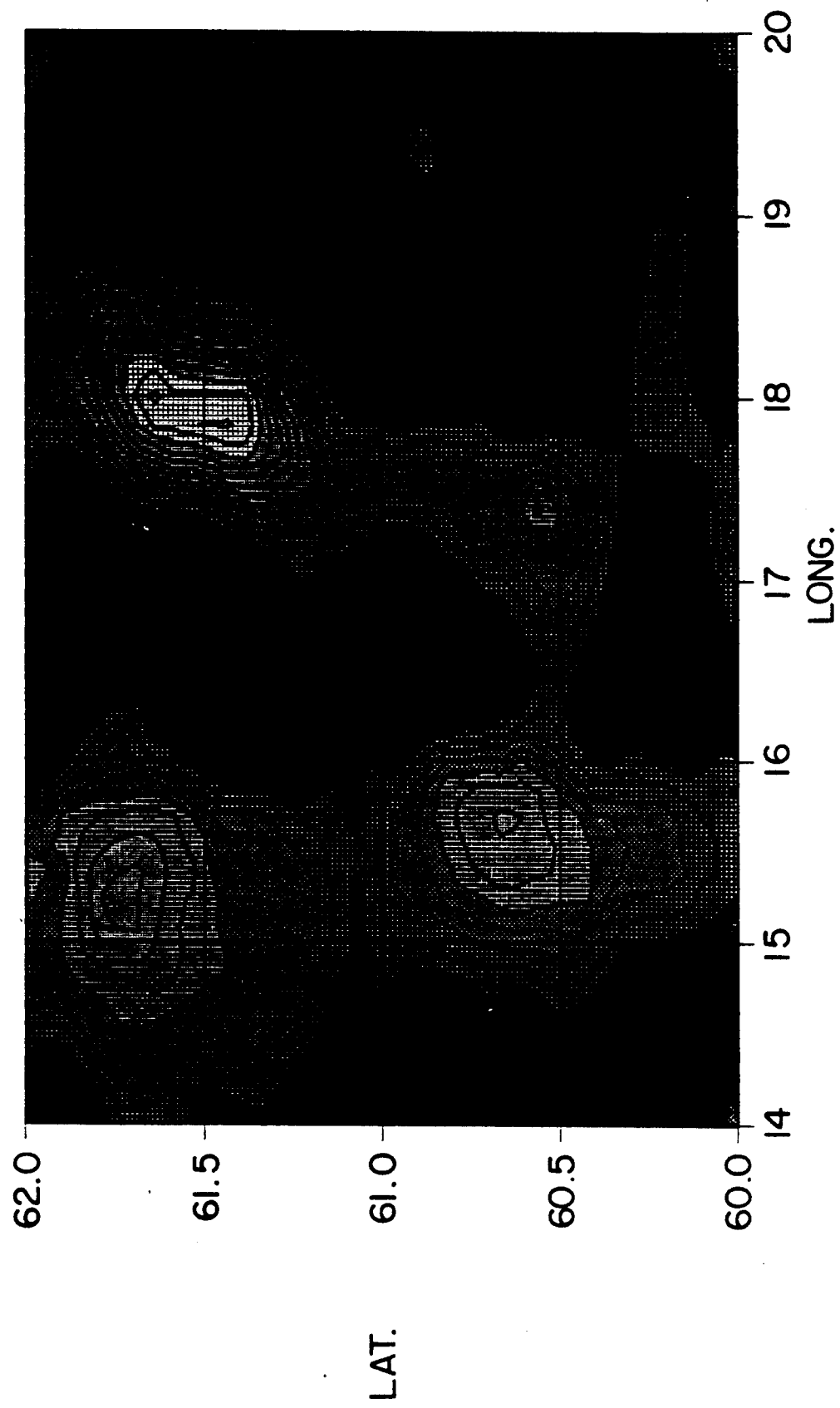
FIG. 4 is a graphic representation, corresponding to FIG. 3, of said third matrix, said mean value formation having been carried out within squares of a different size.

The step of mean value formation within squares of a selected size, and the subsequent upward interpolation, may be repeated for squares of different sizes, whereby phenomena of different sizes may be studied. This is shown in FIG. 4 which is a view corresponding to FIG. 3 and graphically illustrates the third matrix when said mean value formation within squares has been carried out with a smaller square size than in FIG. 3. In FIG. 4, the distance between the altitude curves is but 0.025 m, and this means that bends having a smaller geographical extent than in FIG. 3 are shown.

As already mentioned, the third matrix produced in this manner will reflect regional variations in the geoid position. These variations depend upon the density conditions at the sea floor below the water surface, but also on the water depth (i.e. the sea floor topography). In order to refine variations in the geoid position depending upon density variations at the sea floor, it will therefore be necessary to eliminate the effect of the water depth, and this is done in the next step.

The water surface may be regarded as an undulating surface which is composed of several superimposed functions, one of which represents the water depth. The objective is to find the function which best represents the interference of the water depth with the undulating surface and to subtract this function from the undulating surface, such that it only reflects density variations in the sea floor. This objective is achieved by means of regression analysis utilising the water depth as the input value.

On the continental shelves where it is economically feasable to drill for hydrocarbons, the sea floor topography has been carefully mapped on nautical charts. In this step, use is made of a chart covering the search area, and for this chart water depth data are taken which are digitalised. The water depth matrix produced in this manner is then interpolated to the same matrix size as the water surface matrix. By means of the water density and the water volume, it is then calculated how the water mass affects the shape of the water surface. This calculation results in a matrix having correction values for how the water mass or the water depth affects the surface. Then a mean value formation according to the same model as for the water surface is carried out, and for this the same square size as before is, of course, selected. In this manner, a fourth matrix for correction of the regional effect of the water depth is obtained. To correct the third matrix, the fourth matrix is added to the third matrix, and this gives a fifth matrix showing how the geoid is regionally affected by underlying geological phenomena, i.e. by density variations in the underlying sea floor. Calculation is repeated for different density values, and for each density value the height values in the fifth matrix are summed-up. Finally, that density value is selected which gives the lowest sum of the height values because this value provides for optimum reflection of the interference of the sea floor topography with the surface. The fifth matrix is the finished matrix which shows regional variations in the geoid position above a reference level and downwardly, i.e. when the density at the sea floor is lower than in the surroundings. In areas where the sea surface has an upward bend, i.e. where the density at the sea floor is higher than that of the surroundings, the prospects of finding oil or gas are very low. To minerals and ores, the reverse applies.

If desired, the fifth matrix may then be processed by calculating how the geoid is affected by known geological systems (salt lentils, salt plugs, high density systems, etc.).

Figure 5A:
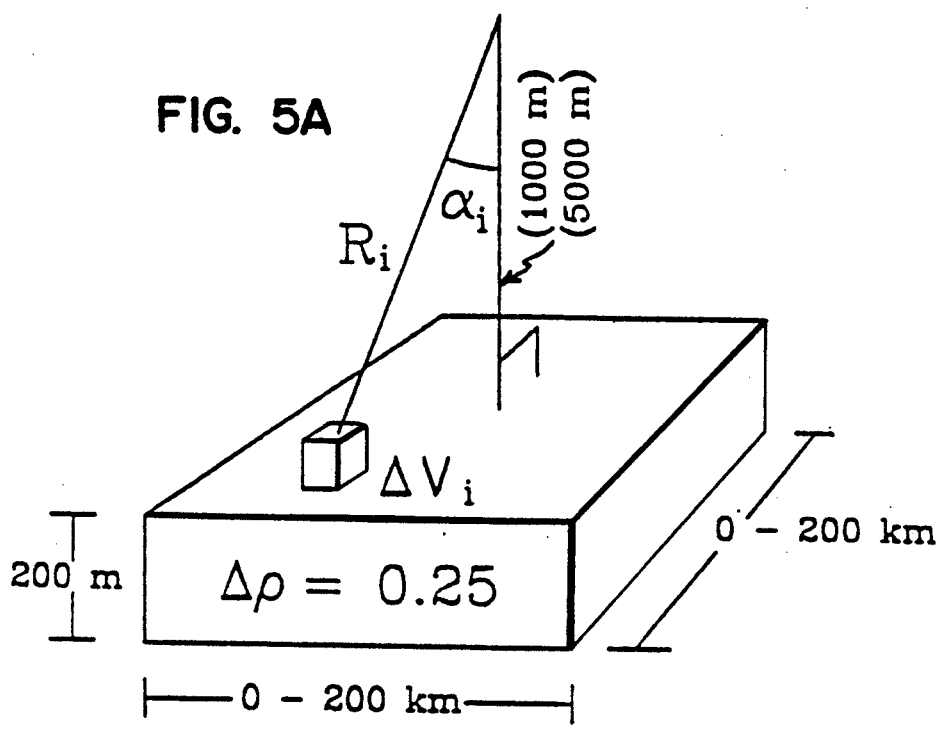
FIG. 5a and 5b are diagrams illustrating the interference of layers of varying extension on the geoid position with gravitation.
Figure 5B:
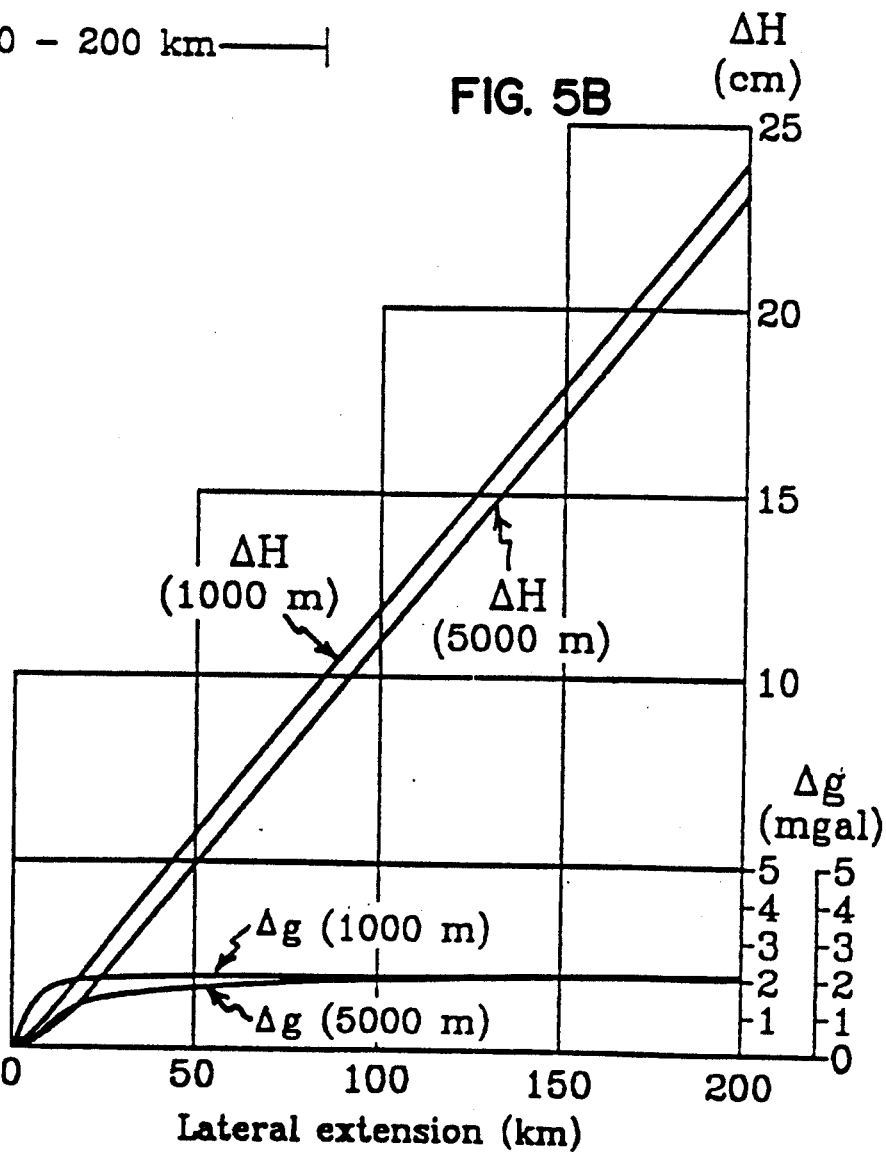

FIGS. 5a and 5b, finally, illustrate a comparison between the method according to the invention and prior art gravimetrical technique for an assumed part area, the density of which distinguishes from that of the surroundings and which is in the form of a square block having a thickness of 200 m.

The interference of the part area with the geoid position is calculated by means of the formula $$\Delta h \approx \Sigma\Sigma\Sigma \frac{G \times \Delta \rho \times \Delta V_i}{g_o \times R_i}$$

wherein
$\Delta h$ is the change in the geoid position caused by the assumed deposit;
G is Newton's gravitation constant $= 6.67 \cdot 10^{-11} Nm^2/kg^2$;
$\Delta b$ is the density difference between the surroundings and the deposit and has been set at 0.25 $kg/dm^3$;
$\Delta V_i$ is a volume element in the form of a cube whose side is 100 m;
$g_o$ is the normal gravity acceleration $= 9.80 m/s^2$;
$R_i$ is the radial distance expressed in meters from said volume element to the point on the water surface for which $\Delta h$ is determined;
and the summation is carried out for all volume elements $\Delta V_i$.

The interference of the part area with the gravity acceleration is calculated by means of the formula $$\Delta g \approx \Sigma\Sigma\Sigma \frac{G \times \Delta b \times \Delta V_i}{R_i^2} \cos \alpha_i$$

wherein $\Delta g$ is the change in the gravity acceleration caused by the interference from the part area, $\alpha_i$ is the angle between the vertical line and the radial line to said volume element $\Delta V_i$, the remaining parameters have the same significance as in the above formula, and the summation is carried out for all volume elements $\Delta V_i$.

The result is plotted in the diagrams shown in FIGS. 5a and 5b, $\Delta h$ being given in centimeters and $\Delta g$ in mGal on the ordinate, and the extension of the part area being given in kilometers on the abscissa. The diagram clearly shows that $\Delta h$ increases essentially linearly with the extension of the part area, while $\Delta g$ relatively quickly attains a given value which it then retains regardless of the extension of the deposit. Even if $\Delta h$ and $\Delta g$ are not directly comparable, the calculations clearly indicate that $\Delta h$ gives more reliable indications of widespread density variations and accordingly possibilities for the existence of large and commercially profitable deposits of natural resources. The reason for this is that the part area merely affects the vertical component at gravimetrical measurements, whereas the water surface in each point is affected by the entire gravitation and thereby forms an equipotential surface. For part areas of large extension, the contribution to $\Delta g$ by the volume element $\Delta V_i$ with a large angle $\alpha_i$ will be very low, while $\Delta h$ is affected to a far greater extent.

I claim:

1. A method of making for an area a map or a representation of regional variations in the position of the geoid which have an amplitude less than about 1 m. that are caused by density variations in the underlying sea floor, said map or representation being intended primarily for use in the determination of part areas of the sea floor with increased probability of deposits of natural resources, the density of which part areas distinguishes from that of the surroundings, downward bends in the geoid towards the sea floor indicating part areas having a density lower than that of the surroundings, and upward bends in the geoid from the sea floor indicating part areas having a density higher than that of the surroundings, said method comprising the steps of:
   (a) obtaining height values which indicate the sea surface height in relation to a reference level and which have been calculated by means of altimeter data measured from a flying craft and by means of information about the orbits of the flying craft during measurement of the altimeter data;
   (b) sorting out incorrect and improbable values; and
   (c) adapting the height values corresponding to different orbits of the flying craft to one another, such that maximum agreement of height values is obtained in the crossing points of the orbits, whereby relative values of the geoid position are established, characterized by
   (d) filtering off long-wave variations with a wave length exceeding about 200 km in the geoid position;
   (e) amplifying variations in the geoid position which have a selected spread, said amplification including the steps of dividing the area into smaller areas, calculating the mean value of the values adapted in accordance with step (c) within the smaller areas, and subtracting within each smaller area the calculated mean value from each of said height values within said smaller area; and (f) correcting the geoid position in respect of interference from the water depth.

2. A method as claimed in claim 1, characterised in that the correction of the water depth comprises determining the mass of the water in an area of a given size around each point corresponding to a height value, by means of the water depth within the area of said given size and a value of the water density, determining a correction factor for the interference of the water mass with the geoid position for each point corresponding to a height value, dividing said area to be mapped into smaller areas, forming the mean value of said correction factors for each smaller area, and adding the mean value of said correction factors to each height value within each smaller area.

3. A method as claimed in claim 2, characterised in that correction for the water depth is repeated with different values of water density, that the height values after correction are summed up for each value of the density, and that the density value which gives the lowest sum of the height values is selected for correction of the water depth.

* * * * *